United States Patent
Martija et al.

(10) Patent No.: US 7,099,351 B2
(45) Date of Patent: Aug. 29, 2006

(54) METHOD AND SYSTEM FOR REMOTE MEASUREMENT OF NETWORK TRAFFIC

(75) Inventors: Ricardo V. Martija, East Brunswick, NJ (US); Walter D. Sincoskie, Hampton, NJ (US); Samaradasa Weerahandi, Pittstown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1407 days.

(21) Appl. No.: 09/771,410

(22) Filed: Jan. 26, 2001

(65) Prior Publication Data

US 2002/0126624 A1 Sep. 12, 2002

(51) Int. Cl.
H04L 12/28 (2006.01)
H04J 3/16 (2006.01)
G01R 31/08 (2006.01)

(52) U.S. Cl. .................. 370/468; 370/395.1; 370/235; 370/396

(58) Field of Classification Search ................ 370/350, 370/395.2, 468, 241, 247, 252, 230, 400; 709/203, 213, 224, 223, 226, 229
See application file for complete search history.

(56) References Cited

U.S. PATENT DOCUMENTS 5,706,436 A * 1/1998 Lewis et al. ................ 709/235
5,959,985 A * 9/1999 Freen et al. ................ 370/351
6,459,682 B1 * 10/2002 Ellesson et al. ............ 370/235
6,721,405 B1 * 4/2004 Nolting et al. ............. 379/133
6,763,380 B1 * 7/2004 Mayton et al. ............. 709/224

* cited by examiner

Primary Examiner—Hanh Nguyen
(74) Attorney, Agent, or Firm—Joseph Giordano

(57) ABSTRACT

Methods and systems are provided for determining inter-region and intra-region traffic in one or more networks. To determine the network traffic flowing between a first region and a second region, one or more routers in the first and second regions are identified along with their respective links connecting the routers in the first region to those in second region. A processor located remotely from the routers in the first and second regions then determines discrete used bandwidth samples of the identified links over a period of time. Based on the used bandwidth samples, the processor determines the network traffic flowing between the first and second regions. To determine the network traffic within a region, a sample of hosts each including one or more web servers in the region are selected. The processor identifies the last pairs of identifiable routers on respective routes from the processor to the sample hosts and the respective links connecting the identified last pairs of routers. The processor then determines discrete used bandwidth samples of the identified respective links. Based on the used bandwidth samples, the processor determines the network traffic within the region.

7 Claims, 6 Drawing Sheets

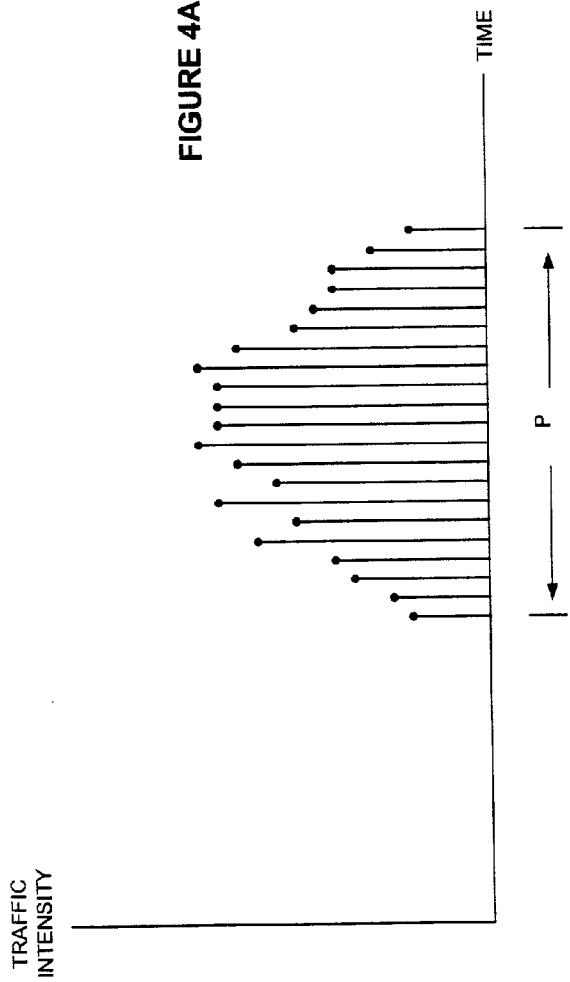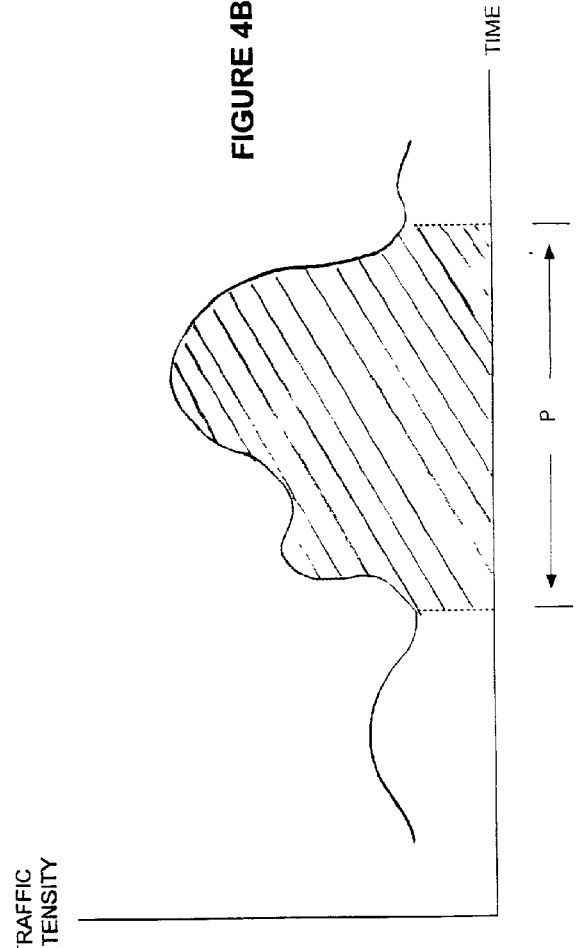

METHOD AND SYSTEM FOR REMOTE MEASUREMENT OF NETWORK TRAFFIC

BACKGROUND OF THE INVENTION

The present invention relates generally to communication networks, and more particularly, methods and systems for remote measurement of traffic in a network, such as the Internet.

Existing methods and systems for measuring traffic through the Internet are quite intrusive. For example, some systems require at the very least installation of additional software at each and every router and web server in the Internet. Others require the installation of traffic monitoring hardware and software at segments of the Internet. As the Internet continues to expand worldwide, however, these existing methods and systems have become prohibitively expensive and impractical. It would be expensive and impractical, if not impossible, to install traffic monitoring devices in each and every router and web server worldwide to measure the total Internet traffic between or within countries.

DESCRIPTION OF THE INVENTION

To overcome the above and other disadvantages of the prior art, methods and systems are provided for determining inter-region and intra-region traffic in one or more networks. A region may be any geographical area including, for example, a town, city, province, state, country, and/or continent.

To determine the network traffic flowing between a first region and a second region, one or more routers in the first and second regions are identified along with their respective links connecting the routers in the first region to those in second region. A processor located remotely from the routers in the first and second regions then determines the used bandwidth of the identified links over a period of time. Based on the determined used bandwidth, the processor determines the network traffic flowing between the first and second regions.

To determine the network traffic within a region, a sample of hosts in the region are selected. The processor identifies the last pairs of identifiable routers on respective routes from the processor to the sample hosts and the respective links connecting the identified last pairs of routers. The processor then determines the used bandwidth of the identified respective links. Based on the determined used bandwidth, the processor determines the network traffic within the region.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BRIEF DESCRIPTION OF THE DRAWINGS

In the Figures:

FIGS. 4A and 4B illustrate graphical representations of the used bandwidth or traffic intensities in a link over a period of time, in accordance with methods and systems consistent with the present invention;

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

In accordance with an embodiment of the invention, the total inter-region traffic in a network is determined using a remote processor. To determine the network traffic flowing between a first region and a second region, the processor identifies the routers in the first and second regions along with their respective backbone links connecting the routers in the first region to those in the second region. The processor then remotely determines discrete used bandwidth samples of the identified links over a desired period of time. Based on the used bandwidth samples, the processor determines the total network traffic flowing between the first and second regions.

In another embodiment, the processor determines the total intra-region traffic in a network based on a sample of selected hosts each including one or more web servers. The processor identifies the last pairs of identifiable routers on respective routes from the processor to the sample hosts and the respective links connecting the identified last pairs of routers. The processor then remotely determines discrete used bandwidth samples of the identified respective links. Based on the used bandwidth samples, the processor determines the total network traffic within the region.

Figure 1:
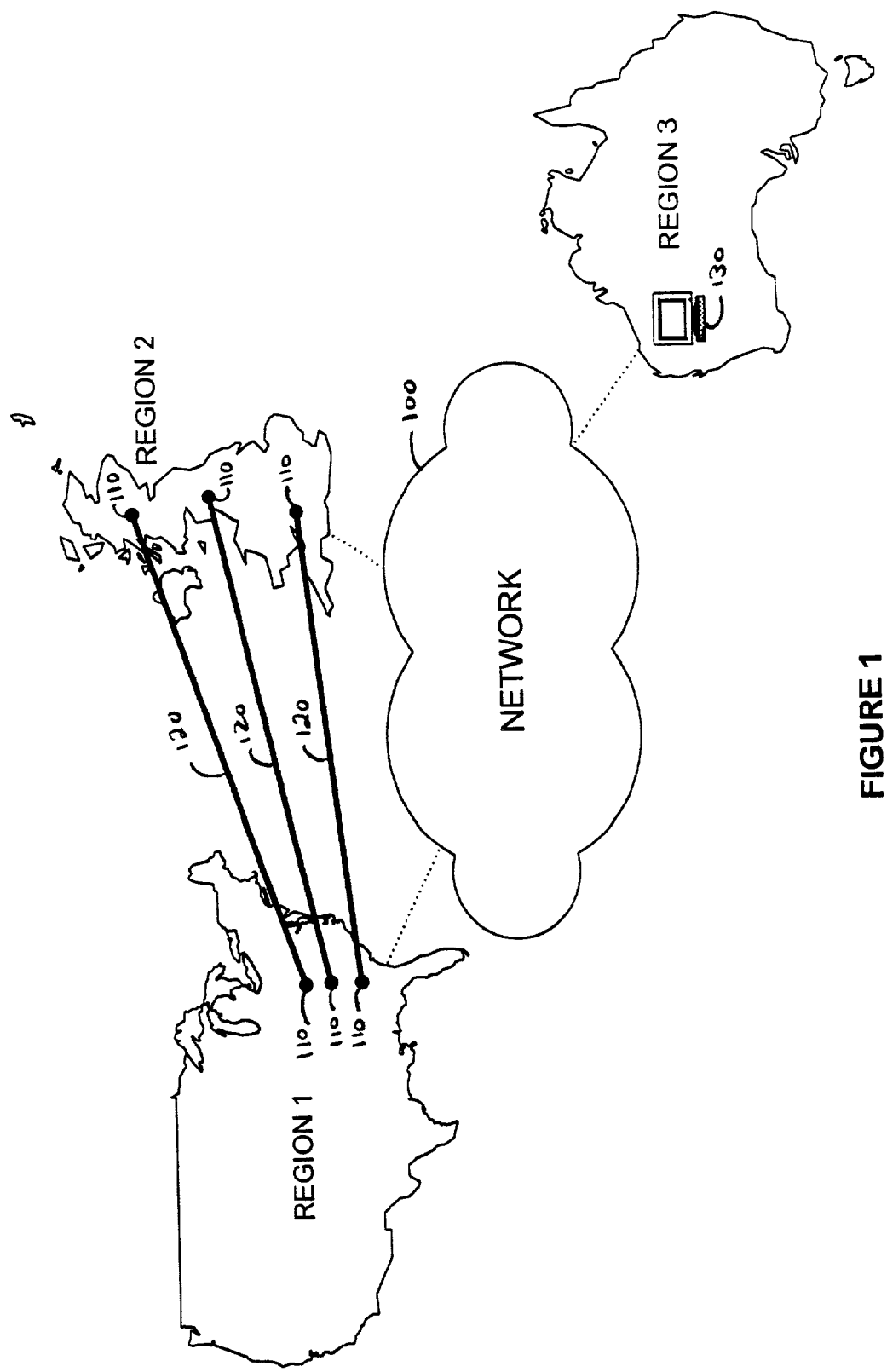
FIG. 1 is a block diagram of a network whose total inter-region and intra-region network traffic are determined, in accordance with methods and systems consistent with the present invention.

FIG. 1 is a block diagram of a network 100, in accordance with methods and systems consistent with the present invention. Network 100 may include a shared network such as the Internet, which spans a plurality of regions 1, 2, and 3. A region may be any geographical area including, for example, a town, city, province, state, country, and/or continent. A region may include a plurality of hosts (not shown) and a plurality of routers 110 connecting that region via backbone links 120 to routers 110 in one or more other regions.

A host may include one or more web servers. A router may include a device that forwards packets in network 100 based on network layer and routing tables, which may be constructed by routing protocols.

Network 100 may also include a traffic monitor 130 located in region 3 and remotely from routers 110 and their respective backbone links 120 in regions 1 and 2. Alternatively, traffic monitor 130 may instead be placed anywhere in network 100, including in regions 1 and 2 so long as it is placed remotely from routers 110 and backbones 120. Traffic monitor 130 may include any processor, such a computer or a mobile communication device capable of sending and receiving information about network 100.

Figure 2:
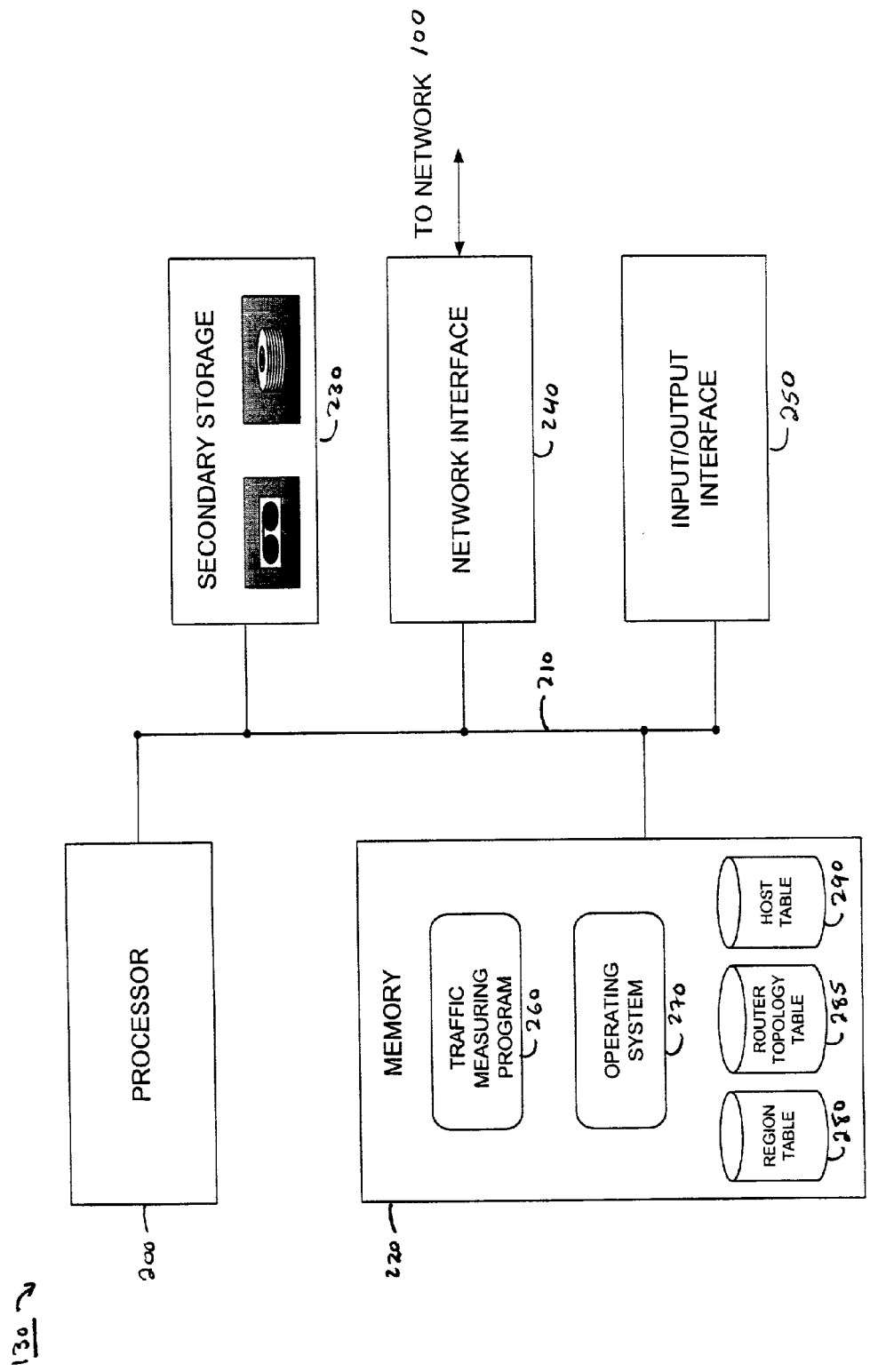
FIG. 2 is a block diagram of a traffic monitor, in accordance with methods and systems consistent with the present invention.

FIG. 2 is a block diagram of traffic monitor 130, in accordance with methods and systems consistent with the present invention. As shown, traffic monitor 130 may include a processor 200, which connects via bus 210 to a memory 220, a secondary storage 230, a network interface module 240, and an input/output module 250.

Memory 220 may include a traffic measuring program 260, an operating system 270, a region table 280, a router topology table 285, and a host table 290. As described below in detail, traffic measuring program 260 may include software, which processor 200 executes to measure total inter-region and/or intra-region traffic in network 100.

Region table 280 may include region information, such as longitude and latitude of various areas in regions 1, 2, and 3. An area may include, for example, a state, province, city, town, etc. within a region. Each entry may include the name of an area, such as a city or state and its associated longitude and latitude.

Router topology table 285 may include information about the topology of routers in network 100, such as the interconnection of routers 110 in regions 1 and 2. Each entry in the router topology table 285 may identify one or more routers 110 to which a router 110 may connect via one or more links. For example, an entry in the router topology table 285 may identify a router 110 in region 1 connecting to a router 110 in region 2 via a backbone link 120. Each entry may include longitude, latitude, and network address information, such as an Internet Protocol (IP) address for a router 110.

A user may populate the entries in the router topology table 285 by downloading the router topology information from Cooperative Association of Internet Data Analysis (CAIDA), which may be accessed on line.

Host table 290 may include information about a sample of hosts in regions 1, 2, and 3. Each entry in the host table 290 may include, for example, a host name, a host address, and associated region information. A host name may include a web name. A host name may include a network address, such as an IP address of a host in a network 100. Region information may include, for example, the name of the country, state, city, town, etc. where a host is located.

A user may populate the entries in a host table 290 by downloading sample host information from, for example, Netsizer, a tool developed and made available by Telcordia Technologies, Inc. A Netsize database includes names and addresses of sample hosts worldwide. The user may purchase from Telcordia Technologies, Inc. a copy of the database and load portions or all of the database into host table 290.

Secondary storage 230 may include a computer readable medium such as a disk drive and a tape drive. From the tape drive, software and data may be loaded onto the disk drive, which may then be copied onto memory 220. Similarly, software and data in memory 220 may be copied onto the disk drive, which may then be loaded onto the tape drive.

Network interface module 240 may include hardware and software for sending and receiving information from network 100.

Input/Output interface 250 may include, for example, a key board or a key pad and a display unit.

Figure 3:
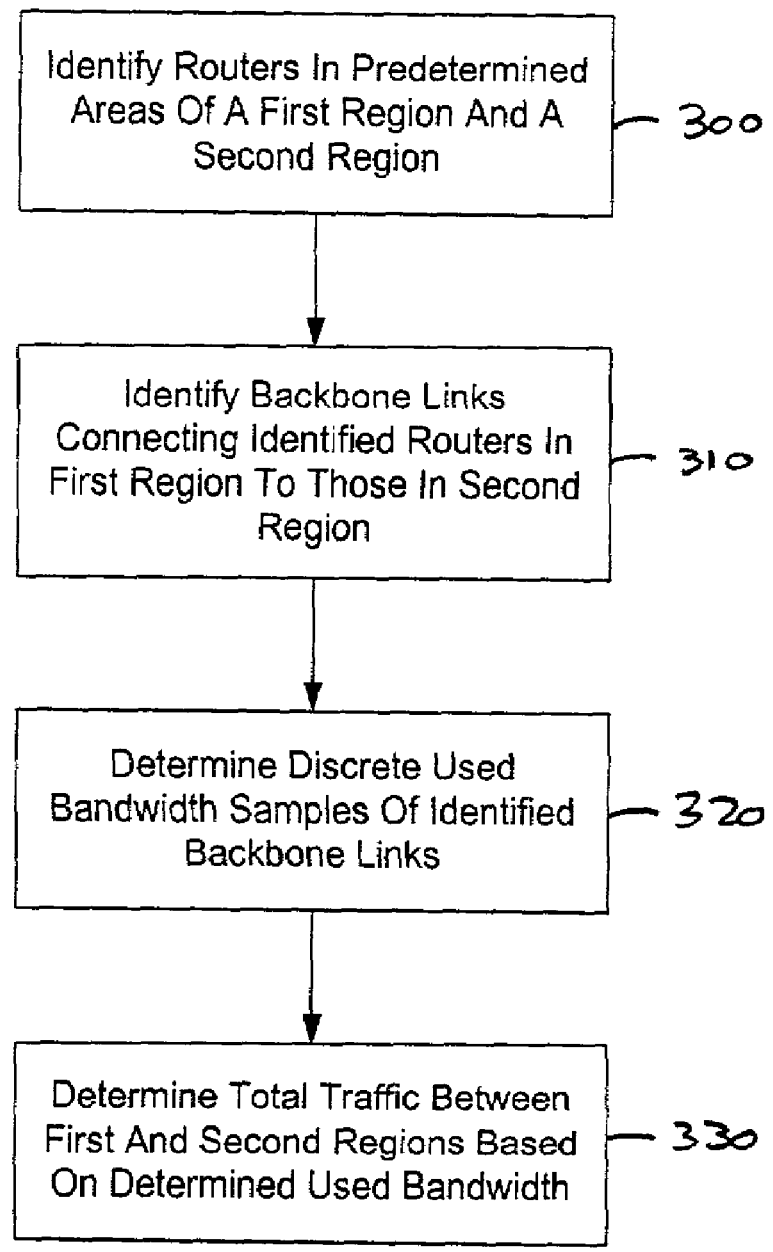
FIG. 3 is a flow chart of the steps for remotely measuring network traffic between two regions, in accordance with methods and systems consistent with the present invention.

FIG. 3 is a flow chart of the steps traffic measuring program 260 in traffic monitor 130 performs to remotely measure network traffic between two regions, for example regions 1 and 2, in accordance with methods and systems consistent with the present invention. Traffic measuring program 260 may search the router topology table 285 to identify those routers 110 in region 1 that connect to routers 110 in region 2 (step 300). To identify such routers, traffic measuring program 260 may cross-reference the longitude and latitude information in the entries of the router topology table 285 against the region table 280. For each entry in the router topology table 285, if the longitude and latitude of a router 110 falls within region 1, then traffic measuring program 260 may determine whether the longitude and latitude of any other router 110 connected to that router falls within region 2. If the longitude and latitude of a connected router 110 falls within region 2, traffic measuring program 260 may select that entry. Otherwise, traffic monitoring program 260 may retrieve the next entry in the router topology table and repeat the above steps until all routers 110 in region 1 that connect to routers 110 in region 2 are identified.

Traffic measuring program 260 may then identify the backbone links connecting the routers according to the network addresses of the routers at each end of the backbone links (step 310). For example, a backbone link may be identified according to the IP address of a router 110 in region 1 at one end of the backbone link and the IP address of another router 110 in region 2 at the other end of the backbone link.

Traffic measuring program 260 may then determine the used bandwidth of each of the identified backbone links connecting the routers 110 in region 1 to those in region 2 (step 320). For example, traffic measuring program 260 may invoke a getbandwidth ( ) routine to estimate the used bandwidth of each identified backbone link. The getbandwidth( ) routine may be purchased from Telcordia Technologies, as pan of the Netsizer tool and bounded by the traffic measuring program 260.

Traffic measuring program may then repeatedly invoke the getbandwidth( ) routine for each identified backbone link. Traffic measuring program 260 may invoke the getbandwidth( ) routine with the following parameters: 1) the IP address of a router 110 in region 1 at one end of a backbone link, 2) the IP address of another router 110 in region 2 at the other end of the backbone link, and 3) a number of discrete used bandwidth samples to be taken from the backbone link over a period of time $P=[t_0, t_1]$. Traffic measuring program 260 then may determine a plurality of discrete used bandwidth samples for each identified backbone link 120 by repeatedly invoking the getbandwidth( ) routine for each identified backbone link 120. As an illustration, FIG. 4A depicts a graphical representation of the discrete used bandwidth or traffic intensity samples for an identified backbone link 120, over the period of time $P=[t_0, t_1]$.

Based on the discrete used bandwidth samples, traffic measuring program 260 may then determine the total network traffic flowing between regions 1 and 2 (step 330). For example, traffic measuring program 260 may first determine the mean traffic $\hat{\mu}_j$ of the identified backbone links as follows:

$$\hat{\mu}_j = \frac{\sum_{i=1}^{n} I_{ij}}{n}$$

where $I_{ij}$ represents the used bandwidth or traffic intensity sample i of an identified backbone link $120_j$, and n represents the total number of used bandwidth samples taken from the identified backbone link $120_j$ during the period $P=[t_0, t_1]$.

Traffic measuring program 260 may then determine the total network traffic T flowing between regions 1 and 2 over the period of time $P=[t_0, t_1]$ as follows:

$$T = P \cdot \sum_{j=1}^{N} \hat{\mu}_j$$

where N represents the total number of backbone links 120 connecting routers 110 in region 1 to routers 110 in region 2. Traffic measuring program 260 may then determine the variance V of the total traffic T as $s^2 = V(T)$, determining, for example, a 95% confidence interval for the total traffic represented as $T \pm 1.96\ s$.

Alternatively, after determining the discrete samples of used bandwidth for each identified backbone link 120 over a period of time $P=[t_0, t_1]$, traffic measuring program 260 may fit the discrete samples to a traffic model, such as a Fourier series or a polynomial model of the form $I(t) = \alpha + \beta t + \gamma t^2 + \lambda t^3$, where t represents time, and $\alpha$, $\beta$, $\gamma$, and $\lambda$ represent the parameters of the traffic model.

Traffic measuring program 260 may then invoke any commercially available software, such as SAS, SPSS, Splus, etc. to estimate each of the parameters. These software packages are developed by SAS Institute, SPSS, and Splus, respectively.

Traffic measuring program 260 may use a least squares method, such as that of the Splus software to estimate the parameters $\alpha$, $\beta$, $\gamma$ and $\lambda$. Alternatively, the traffic measuring program may invoke the Base SAS tool. FIG. 4B is a graphical representation of a resulting continuous traffic model based on the estimated parameters. Traffic measuring program 260 may then determine the total traffic T flowing between regions 1 and 2 by integrating the traffic model I(t) over the period of time $P=(t_0, t_1)$, as shown by the shaded area in FIG. 4B.

In another embodiment, traffic measuring program 260 may select only a random sample of routers 110 in region 1 connected via backbone links 120 to routers 110 in region 2. Traffic measuring program 260 may then perform the steps 300–330 as described above to determine a plurality of discrete used bandwidth samples for each sample backbone link 120. To determine the total traffic flowing between regions 1 and 2, however, traffic measuring program 260 may first estimate the total number $\hat{N}$ of backbone links 120 connecting routers 110 in region 1 to those in region 2. Based on the estimated total number of backbone links, traffic measuring program 260 may then determine the total network traffic T flowing between regions 1 and 2 as follows:

$$T = P \cdot \hat{N} \cdot \frac{\sum_{j=1}^{m} \hat{\mu}_j}{m},$$

where $\hat{\mu}_j$ represents the mean used bandwidth of the sample backbone links as described above, m represents the number of the sample backbone links 120, and $\hat{N}$ represents the estimated total number of backbone links 120 connecting routers 110 in region 1 to those in region 2.

Figure 5:
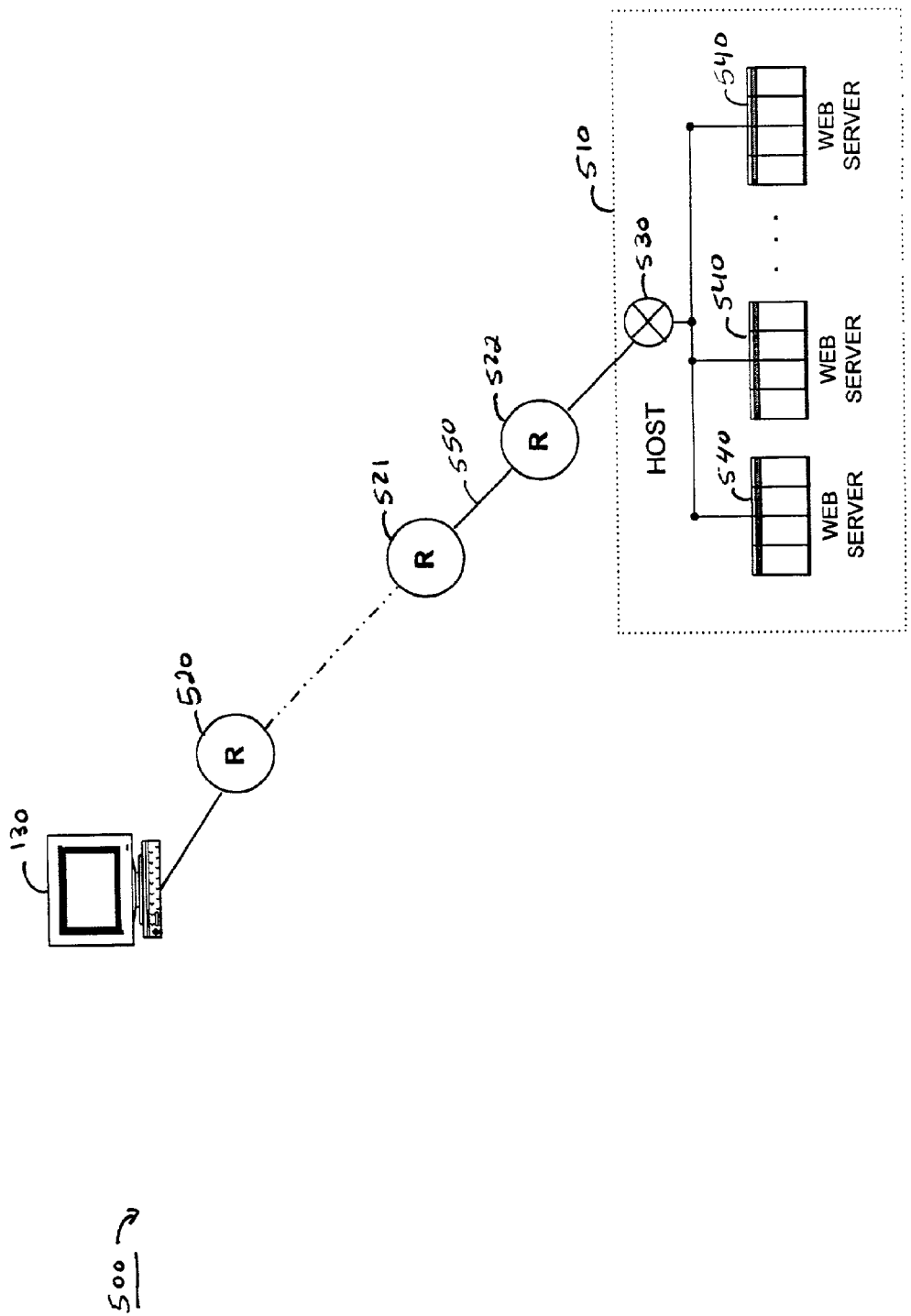
FIG. 5 is a block diagram of traffic monitor remotely measuring network traffic within a region, in accordance with methods and systems consistent with the present invention.

In yet another embodiment, traffic monitor 130 may determine the total network traffic within a region, such as region 1. FIG. 5 shows a block diagram of traffic monitor 130 remotely measuring network traffic within region 1, in accordance with methods and systems consistent with the present invention. As shown, traffic monitor 130, which may be remotely located in region 3, queries and receives information about a plurality of hosts 510 in region 1 via one or more routers 520, 521, and 522. Although for the sake of simplicity FIG. 5 shows a single host 510, region 1 may include a plurality of hosts 510.

A host 510 may include, for example, a load balancer 530 and one or more web servers 540, and may be identified in the network by the IP address of load balancer 530. Load balancer 530 balances the load on web servers 540 by forwarding communications destined to host 510 to web servers 540 such that the communications are evenly distributed among web servers 540. Alternatively, a host may include one or more servers directly connected to one or more routers in network 100.

Figure 6:
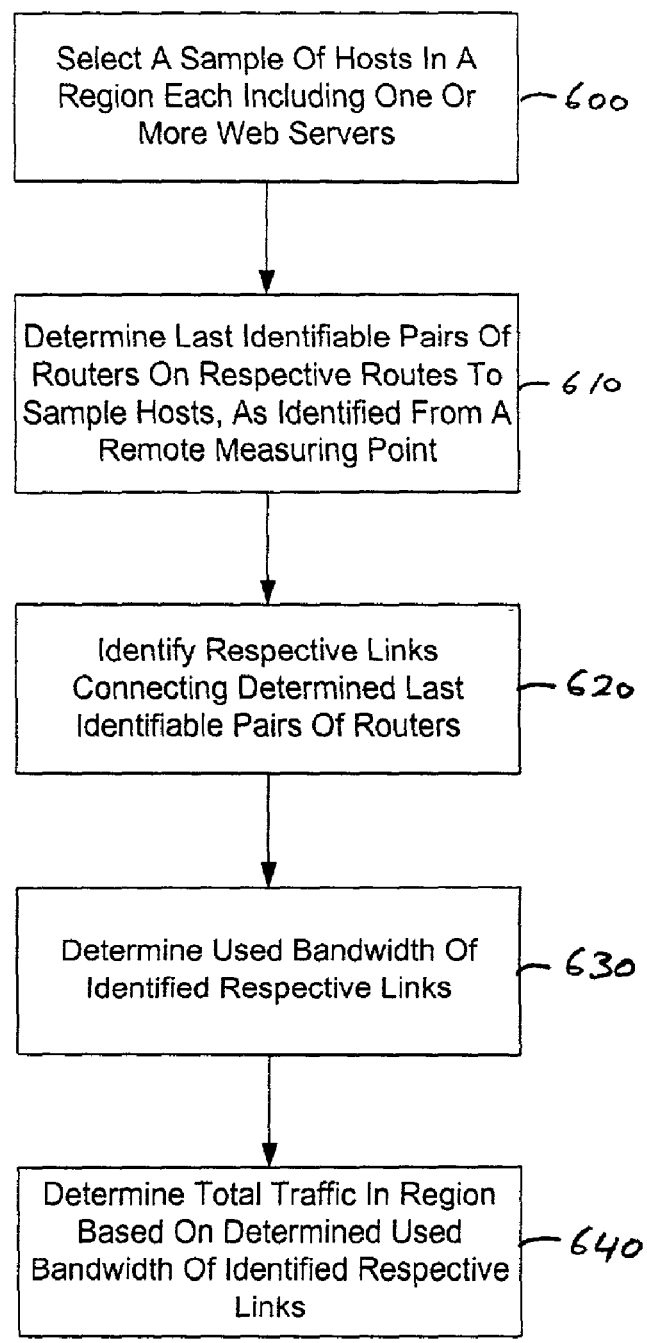
FIG. 6 is a flow chart of the steps for remotely measuring network traffic within a region, in accordance with methods and systems consistent with the present invention.

FIG. 6 is a flow chart of the steps traffic measuring program 260 performs to remotely measure network traffic within region 1, in accordance with methods and systems consistent with the present invention. Traffic measuring program 260 may select from host table 290 a sample of hosts 510 that include one or more web servers and located in region 1 (step 600). To identify such sample hosts 510, traffic measuring program 260 may parse each host name in the entries of host table 290 to identify those hosts 510 whose host names include the term for the world wide web.

Alternatively, traffic measuring program 260 may invoke a portscan( ) routine to determine whether a host in region 1 includes a web server. The parameters of the portscan( ) routine may include the IP address of a host in region 1, which traffic measuring program 260 may retrieve from host table 290, and a port number 80. If portscan( ) returns a value indicating that port number 80 in a host is open, traffic measuring program 260 may determine that the host includes a web server and selects that host as a sample host. Otherwise, traffic measuring program 260 may determine that the host does not include a web server. Traffic measuring program 260 may then retrieve the next entry in host table 290 and repeats this step until a desired number of sample hosts are identified.

Traffic measuring program 260 may then determine the last identifiable pairs of routers on respective routes to sample hosts 510 by, for example, trace routing each identified sample host 510 (step 610). For each sample host, traffic measuring program 260 may invoke a traceroute( ) routine to identify routers on a route from traffic monitor 130 to the sample host 510. For a particular route, traffic measuring program 260 may select the last two identifiable routers in a sequence with the shortest hop to the sample host 510. In the embodiment of FIG. 5, the last two identifiable routers on a route from traffic monitor 130 to the sample host 510 are routers 521 and 522, which are connected to each other via link 550.

Traffic measuring program 260 may then identify the links connecting each of the selected pair of routers (step 620). For example, traffic measuring program 260 may identify each link according to the IP addresses of the pair of routers at each end of the link. Traffic measuring program 260 may determine discrete used bandwidth samples of each identified link over a period of time $P=[t_0, t_1]$ (step 630). For example, traffic measuring program 260 may estimate the used bandwidth of each identified link using the getbandwidth( ) routine.

Alternatively, if a sample host 510 is pingable, traffic measuring program 260 may identify links connecting the sample host 510 to the last identifiable router with the shortest hop to the sample host 510. Traffic measuring program 260 may determine discrete used bandwidth samples of the identified link over a period of time P=[$t_0$, $t_1$] by invoking the getbandwidth( ) routine.

Based on the discrete samples of used bandwidth of the identified links, traffic measuring program 260 may then determine the total traffic within region 1 as follows (step 640): Traffic measuring program 260 may first determine the mean traffic $\hat{\mu}_j$ of the identified links as follows:

$$\hat{\mu}_j = \frac{\sum_{i=1}^{n} I_{ij}}{n}$$

where $I_{ij}$ represents the used bandwidth sample i of an identified link j, and n represents the total number of used bandwidth samples taken from the identified link j by traffic measuring program 260 over the period of time P=[$t_0$, $t_1$].

Traffic measuring program 260 may then estimate the total number $\hat{N}$ of hosts 510 in region 1 by invoking, for example, a host_estimate( ) routine of the Netsizer tool. The host_estimate routine may be purchased from Telcordia Technologies, Inc.

Based on the estimated total number of hosts in region 1, traffic measuring program 260 may then determine the total traffic within region 1 as follows:

$$T = P \cdot \hat{N} \cdot \frac{\sum_{j=1}^{m} \hat{\mu}_j}{m}$$

where $\hat{\mu}_j$ represents the mean used bandwidth of an identified link j as described above, m represents the number of identified links j, and $\hat{N}$ represents the estimated total number of hosts in region 1, as identified by traffic measuring program 260. Traffic measuring program 260 may then determine the variance V of the total traffic T as $s^2$=V (T), determining, for example, a 95% confidence interval for the total traffic represented as T±1.96 s.

Alternatively, after determining the discrete samples of used bandwidth of each identified link over a period of time P=[$t_0$, $t_1$], traffic measuring program 260 may then fit the determined used bandwidth I to a traffic model, as described with respect to step 330 of FIG. 3.

While it has been illustrated and described what are at present considered to be preferred embodiments and methods of the present invention, it will be understood by those skilled in the art that various changes and modifications may be made, and equivalents may be substituted for elements thereof without departing from the true scope of the invention. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for determining network traffic flowing between a first region and a second region, said method comprising the steps of:
    identifying two or more routers in the first region by determining a longitude and a latitude of the two or more routers in the first region;
    identifying two or more routers in the second region by determining a longitude and latitude of the two or more routers in the second region;
    identifying links that connect the identified two or more routers in the first region to the identified two or more routers in the second region, the step of identifying the links comprising the steps of:
        retrieving information about topology of the two or more routers in the first and second regions;
        selecting the two or more routers in the first region whose determined longitude and latitude are in predetermined areas of the first region;
        selecting the two or more routers in the second region whose determined longitude and latitude are in predetermined areas of the second region; and
        comparing the latitude and longitude of the selected two or more routers in the first and second regions with the retrieved topology information to identify links that connect the selected two or more routers in the first region to the selected two or more routers in the second region;
    determining, at a processor remote from the two or more routers in the first and second regions, used bandwidth of the identified links over a period of time; and
    determining the network traffic flowing between the first and second regions based on the determined used band width.

2. The method of claim 1, wherein the step of determining the used bandwidth comprises the step of:
    determining a plurality of used bandwidth samples of the identified links over the period of time.

3. A method for determining network traffic flowing between a first region and a second region, said method comprising the steps of:
    identifying two or more routers n the first region;
    identifying two of more routers in the second region;
    identifying links that connect the identified two or more routers in the first region to the identified two or more routers in the second region;
    determining, at a processor remote from the two or more routers in the first and second regions, used bandwidth of the identified links over a period of time; and
    determining the network traffic flowing between the first and second regions based on the determined used bandwidth, the step of determining the network traffic comprising the steps of:
        determining an average of a plurality of samples of the used bandwidth remotely determined by the processor; and multiplying the determined average by the period of time to determine the network traffic flowing between the first and second regions.

4. A method for determining the traffic flowing through a first region and a second region, said method comprising the steps of:
   identifying two or more routers in the first region,
   identifying two or more routers in the second region;
   identifying links that connect the identified two or more routers in the first region to the identified two or more routers in the second region;
   determining, at a processor remote from the two or more routers in the first and second regions, used bandwidth of the identified links over a period of time; and
   determining the network traffic flowing between the first and second regions based on the determined used bandwidth, the step of determining the network traffic comprises comprising the steps of:
   estimating a total number of links connecting routers in the first region to routers in the second region; and
   multiplying the estimated total number of links by the determined used bandwidth to determine the network traffic flowing between the first and second regions.

5. A method for determining network traffic within a region, said method comprising the steps of:
   identifying a sample of hosts in the region, each sample including one or more servers;
   identifying, at a processor remote from the sample host, last pairs of identifiable routers on respective routes from the processor to the sample hosts;
   identifying respective links connecting the identified pairs of routers;
   determining used bandwidth of the identified respective links; and
   determining the network traffic within the region based on the determined used bandwidth by estimating a total number of hosts in the region and multiplying the estimated total number of hosts by the determined used bandwidth.

6. The method of claim 5, wherein the step of identifying the last pairs of identifiable routers comprises the steps of:
   invoking a traceroute program at the processor to identify routers on respective routes to the sample hosts; and
   selecting pairs of the identified routers on the respective routes such that each selected pair has a shortest hop to a respective one of the sample hosts.

7. The method of claim 5, wherein the step of determining the used bandwidth comprises the step of:
   invoking a getbandwidth program at the processor to determine a plurality of used bandwidth samples for each of he identified respective links.

* * * * *